US006196602B1

United States Patent
Esplin

(10) Patent No.: US 6,196,602 B1
(45) Date of Patent: Mar. 6, 2001

(54) DEPLOYABLE CARGO RACK FOR PICKUP TRUCK

(76) Inventor: Ian William Esplin, 1022 Pineway Dr., West Palm Beach, FL (US) 33417

( * ) Notice: Subject to any disclaimer, the term of this patent is extended or adjusted under 35 U.S.C. 154(b) by 0 days.

(21) Appl. No.: 09/322,098

(22) Filed: May 28, 1999

(51) Int. Cl.⁷ ...................................................... B60P 3/00
(52) U.S. Cl. ................... 296/3; 296/40; 224/405
(58) Field of Search ................... 296/3, 40; 224/404, 224/405; 410/104, 106, 110

(56) References Cited

U.S. PATENT DOCUMENTS

| | | |
|---|---|---|
| D. 398,284 | 9/1998 | Carter . |
| 2,697,631 | 12/1954 | Miller . |
| 2,993,727 * | 7/1961 | Zewiske .................................. 296/3 |
| 3,888,538 * | 6/1975 | McWilliams ............................ 296/3 |
| 4,138,046 * | 2/1979 | De Freze ................................ 296/3 |
| 4,211,448 | 7/1980 | Weston . |
| 4,343,578 | 8/1982 | Barnes . |
| 4,398,763 * | 8/1983 | Louw ..................................... 296/3 |
| 4,405,170 * | 9/1983 | Raya ...................................... 296/3 |
| 4,444,427 * | 4/1984 | Martin ................................... 296/3 |
| 4,527,827 * | 7/1985 | Maniscalco et al. ................... 296/3 |
| 4,760,986 | 8/1988 | Harrison . |
| 4,869,628 * | 9/1989 | Fletcher ................................. 296/3 |
| 4,938,403 | 7/1990 | Cortelli . |
| 5,037,152 * | 8/1991 | Hendricks ............................. 296/3 |
| 5,118,156 | 6/1992 | Richard . |
| 5,152,570 * | 10/1992 | Hood ...................................... 296/3 |
| 5,190,337 * | 3/1993 | McDaniel .............................. 296/3 |
| 5,259,712 | 11/1993 | Wayne . |
| 5,431,472 * | 7/1995 | Coffland ................................ 296/3 |
| 5,443,190 * | 8/1995 | Cucheran et al. ..................... 296/3 |
| 5,494,327 * | 2/1996 | Derecktor ............................. 296/3 |
| 5,553,762 * | 9/1996 | Brown ................................... 296/3 |
| 5,599,053 * | 2/1997 | Wilson .................................. 296/3 |
| 5,692,791 * | 12/1997 | Sulzer ................................... 296/3 |
| 5,741,038 | 4/1998 | Fowler et al. . |
| 5,743,583 | 4/1998 | Lowe . |

* cited by examiner

*Primary Examiner*—Dennis H. Pedder
*Assistant Examiner*—Kiran Patel
(74) *Attorney, Agent, or Firm*—Mark D. Bowen, Esq.; Stearns, Weaver, Miller, Weissler, Alhadeff & Sitterson, P.A.

(57) ABSTRACT

A deployable cargo supporting apparatus for pickup trucks that is deployable from a stowed configuration wherein load support beams are secured along each of the cargo box side walls by specially configured brackets, to a deployed configuration wherein the load support beams are transversely disposed across the width of the cargo box, in an elevated position above the floor, and secured on opposing ends by said brackets. In the stowed configuration, each load support beam, and a pair of tie-down devices slidably disposed thereon, is secured parallel to the cargo box sidewall proximate the top portion thereof by retaining pins projecting from each of the brackets. In the deployed configuration, each support beam is positioned transversely across the width of the pickup truck cargo box, and the opposing end portions of each of said beams are anchored and received within the U-shaped top portion of corresponding bracket members thereby providing elevated, load carrying beams capable of supporting substantial loads above the floor of the cargo bed. A pair of tie-down members are slidably disposed on each load support beam.

9 Claims, 8 Drawing Sheets

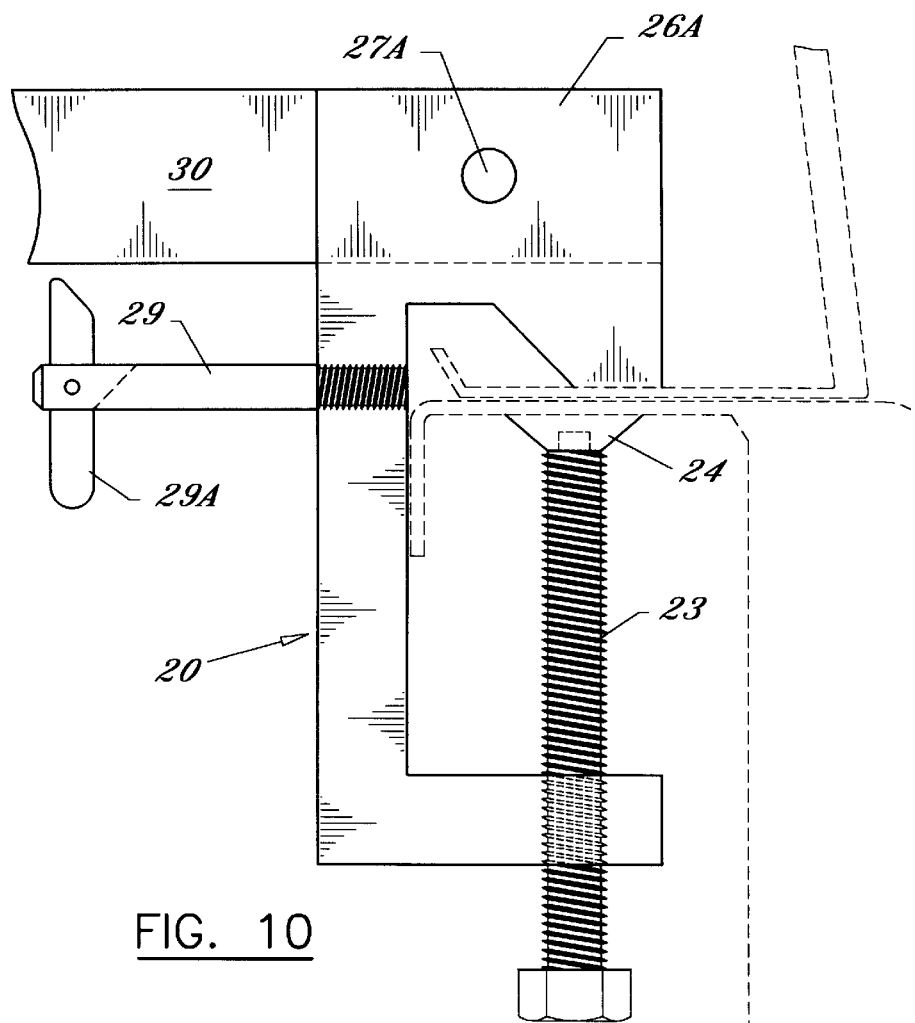
FIG. 10
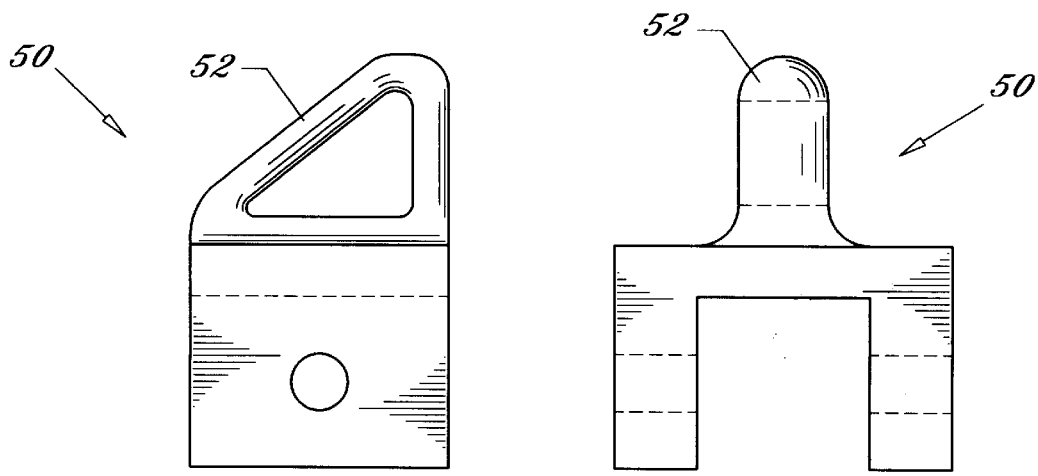
FIG. 11A
FIG. 11B

DEPLOYABLE CARGO RACK FOR PICKUP TRUCK

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to load supporting devices, and, more particularly to a deployable load supporting cargo rack for pickup trucks for increasing load carrying capacity by providing a load supporting structure for carrying loads in an elevated position above the floor of the cargo bed of a pickup truck. The present invention is suitable for use with a pickup truck with or without a camper top accessory.

2. Description of the Background Art

Trucks are versatile load carrying vehicles in use throughout the world. Pickup trucks are designed for light to medium duty and generally include a passenger cab, and a cargo box bounded by a floor, side walls, and a tailgate. Pickup trucks have become increasingly popular over the years as a result of the ability to haul a wide variety of loads. For example, pickup trucks are routinely used for transporting equipment, materials, and tools to and from various job sites. In addition, pickup trucks are commonly used for recreational purposes for transporting recreational equipment such as bicycles, camping and hiking gear and the like. While pickup trucks are used extensively for carrying a wide variety of loads, cargo carrying capacity is limited by the physical dimensions of the cargo bed. Furthermore, the load carrying capacity of pickup trucks is commonly restricted by the installation of after-market cargo box accessories. One type of accessory found on many pickup trucks is a cargo box enclosure, commonly referred to as a camper top. Camper tops are typically attached to the top portions of the cargo box side walls and provide a weather proof cover or roof over the cargo box.

The background art reveals a number of load supporting devices for use with pickup trucks to carry and/or secure cargo. For example, the prior art is replete with devices consisting of rigid elongate frame members attachable to one of the respective sides of the pickup for transporting items such as ladders, pipes, and the like. Typical of such devices is the device described in U.S. Pat. No. 4,211,448, issued to Weston (1980) which discloses an adjustable rigid rack assembly for pickup trucks. Similarly, U.S. Pat. No. 5,743,583, issued to Lowe (1998), and U.S. Pat. No. 5,431,472, issued to Coffland (1995) each disclose a pivoting rigid frame assembly for pickup trucks that is movable from a collapsed first position to a deployed second position for supporting a load. U.S. Pat. No. 5,692,791, issued to Sulzer (1997) discloses a removable rack system for the bed of a pickup truck. U.S. Pat. No. 5,494,327, issued to Derecktor (1996) discloses a sliding rack assembly for adjustably attaching an overhead rack to the side walls of a pickup truck. U.S. Pat. No. 5,741,038 issued to Fowler et al. (1998) discloses an apparatus for extending the effective dimensions of a truck bed. All of the above-referenced devices, however, include structures that are not suitable for use with pickup trucks equipped with cargo box camper tops.

U.S. Pat. No. 5,118,156, issued to Richard (1992) discloses an auxiliary load carrier for use with the cargo box of a pickup truck. The device includes a plurality of clamping supports that are securable to the side walls of the cargo box and a pair of load supporting beams, that span the width of the cargo box, connected to the clamping supports. When properly installed the load supporting beams define a load support plane above the wheel wells for supporting a load. The device disclosed by Richard allows the pickup truck cargo box to be configured to a multi-level cargo carrying configuration. While the load carrying device disclosed by Richard appears suitable for use with pickup trucks equipped with camper tops, the invention includes a number of inherent disadvantages. For example, the clamping supports disclosed by Richard are overly complex and do not provide suitable structure for storing the load support beams when not in use. In addition, the mechanism for connecting the load support beams to the clamping structures relies on a plurality of spaced transverse grooves formed on the bottom surface of the beams. This method of connecting the load support beams to the clamping structures appears unreliable and prone to vibration induced detachment, for example, when the truck travels on rough surfaces.

Accordingly, all of the devices in the background art suffer from a number of disadvantages:

(a) they include rigid rack-like structures that are permanently affixed to the truck and are not easily removable;
(b) they are not suitable for use with trucks having camper top enclosures;
(c) they are not easily transported within the cargo box and deployable and stowable within the cargo box;
(d) they do not include tie-down anchors that adjust position to secure cargo of various dimensions.

BRIEF SUMMARY OF THE INVENTION

The present invention provides a deployable cargo supporting apparatus for pickup trucks having components that are deployable from a stowed configuration wherein load support beams are secured along each of the cargo box side walls by specially configured brackets, to a deployed configuration wherein the load support beams are transversely disposed across the width of the cargo box, in an elevated position above the floor, and secured on opposing ends by said brackets. In the stowed configuration, each load support beam is secured parallel to the cargo box sidewall proximate the top portion thereof by retaining pins projecting from each of the brackets. Accordingly, the invention may be compactly carried within the pickup truck cargo box when not in use. In the deployed configuration, each support beam is positioned transversely across the width of the pickup truck cargo box, and the opposing end portions of each of said beams are anchored and received within the U-shaped top portion of corresponding bracket members. Once deployed, the load support beams are disposed across the width of the cargo bed and elevated above the cargo bed floor thereby providing elevated, load carrying cross members capable of supporting substantial loads above the floor of the cargo bed.

Each bracket includes a clamp having a generally C-shaped portion, for receiving the intuned flange formed by the pickup truck side wall, and a threaded member terminating in a pressure plate for anchoring the bracket to side wall flange. In addition, each bracket further defines a generally U-shaped top portion for receiving an end of one of the load support beams in the deployed configuration. A securing pin is received within corresponding apertures formed in the legs of the U-shaped top portion and in the end of the load support member for anchoring the end of the support beam to the bracket in the deployed configuration. Furthermore, each bracket includes a horizontally projecting storage pin attached thereto, which storage pin is received within an aperture defined by the load support beam in the stowed configuration.

The load support beams are preferably elongate rigid beams having a generally square or rectangular cross section. Each load support beam preferably includes a pair of cargo tie-down devices slidably disposed thereon for providing longitudinally adjustable anchoring structures along the length of the beam. The cargo tie-down devices may be fixed at user selected positions along a particular beam by sliding a tie-down device to a desired position wherein apertures defined by the tie-down device align with a corresponding aperture defined in the beam such that a securing pin may be inserted therethrough. The securing pins and storage pins preferably include pivoting drop tabs connected at one end of each pin, which drop tabs pivot under the influence of gravity to prevent the pin from dislodging from its inserted position in any given configuration.

Accordingly it is an object of the present invention to provide a cargo rack for pickup trucks.

Yet another object of the present invention is to provide a cargo rack for pickup trucks that is easily deployable from a stowed configuration.

Still another object of the present invention is to provide a cargo rack for pickup trucks that is suitable for use with trucks having camper top enclosures.

A further object of the present invention is to provide a deployable cargo rack for pickup trucks that includes adjustable cargo tie-down devices.

Another object of the present invention is to provide a deployable cargo rack for pickup trucks that, upon deployment, allows for additional cargo carrying capacity without requiring the unloading of existing cargo from the floor of the cargo bed.

Still further objects and advantages will become apparent from a consideration of the ensuing description and drawings.

BRIEF DESCRIPTION OF THE SEVERAL VIEWS OF THE DRAWINGS

In the drawings, closely related figures have the same number but different alphabetic suffixes.

FIG. 10 shows a side elevational view of a bracket clamped to the top side rail of a pickup truck having a camper top accessory;

FIG. 11A shows an front elevational view of an alternate embodiment, one-piece, cargo tie-down device;

FIG. 11B shows a side elevational view of the alternate embodiment cargo tie-down device shown in FIG. 11A.

DETAILED DESCRIPTION OF THE INVENTION

Figure 1A:
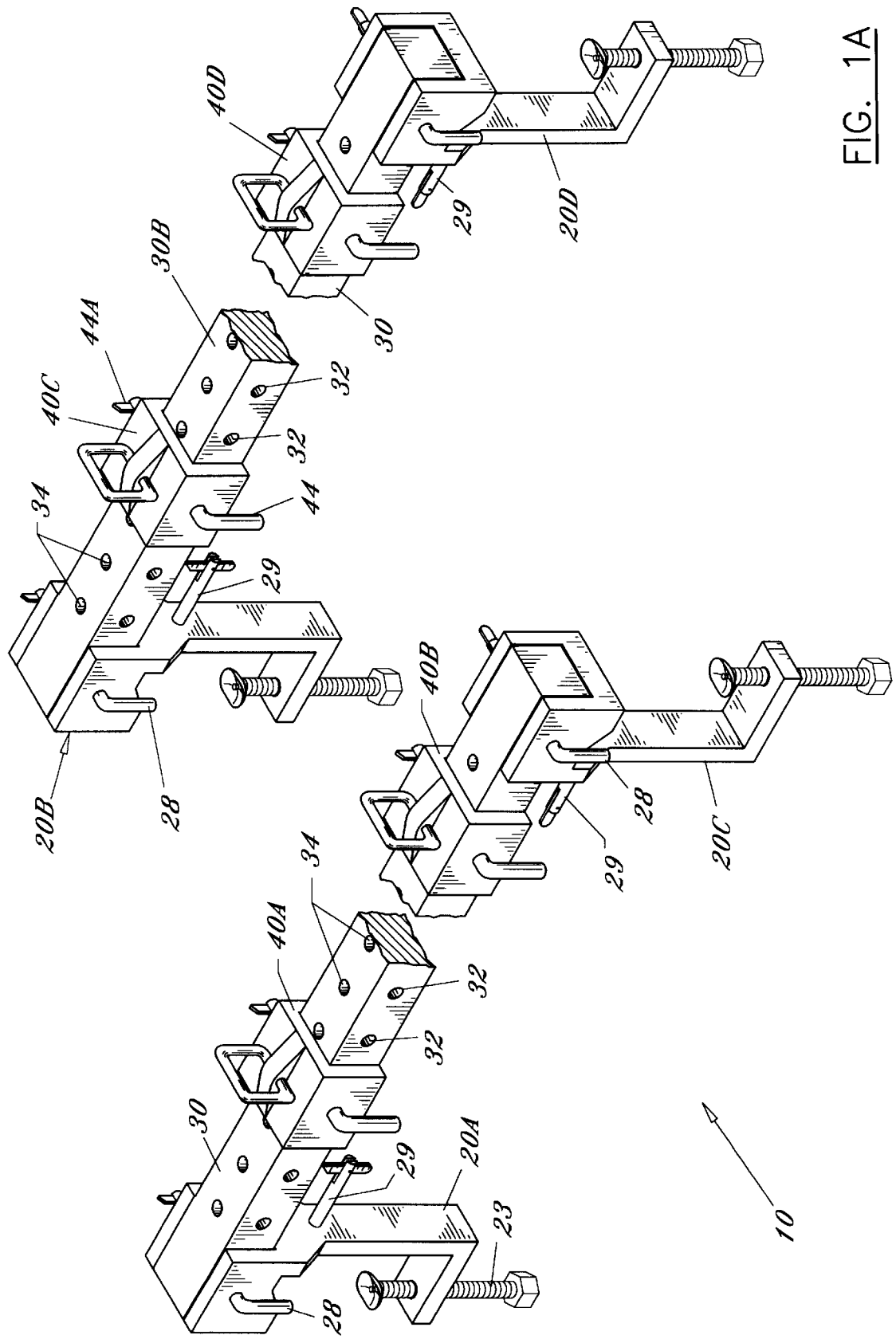
FIG. 1A shows a perspective view of the present invention in the deployed configuration with the load support beams partially cut away.
Figure 1B:
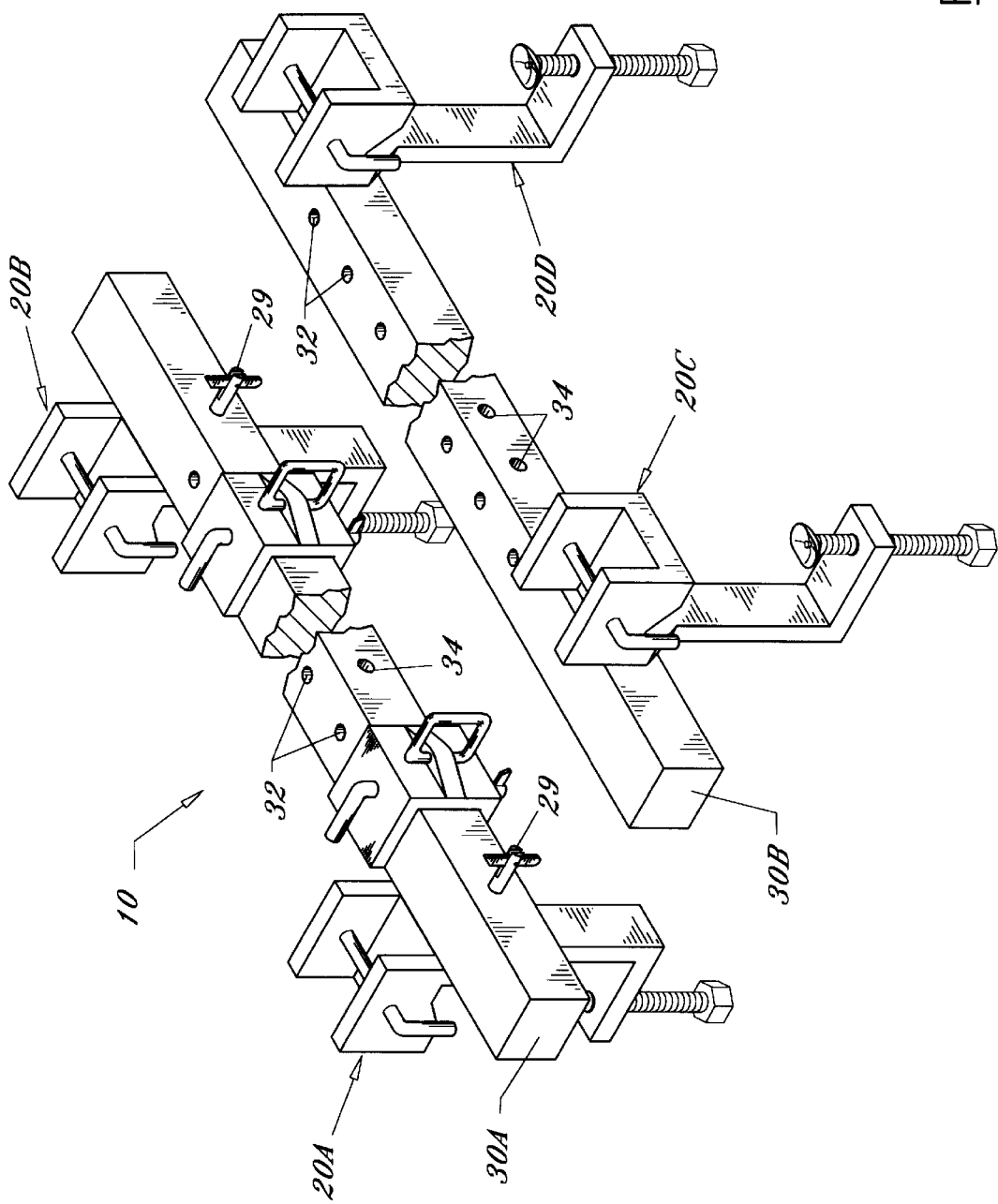
FIG. 1B shows a perspective view of the present invention in the stowed configuration with the load support beams partially cut away.
Figure 2:
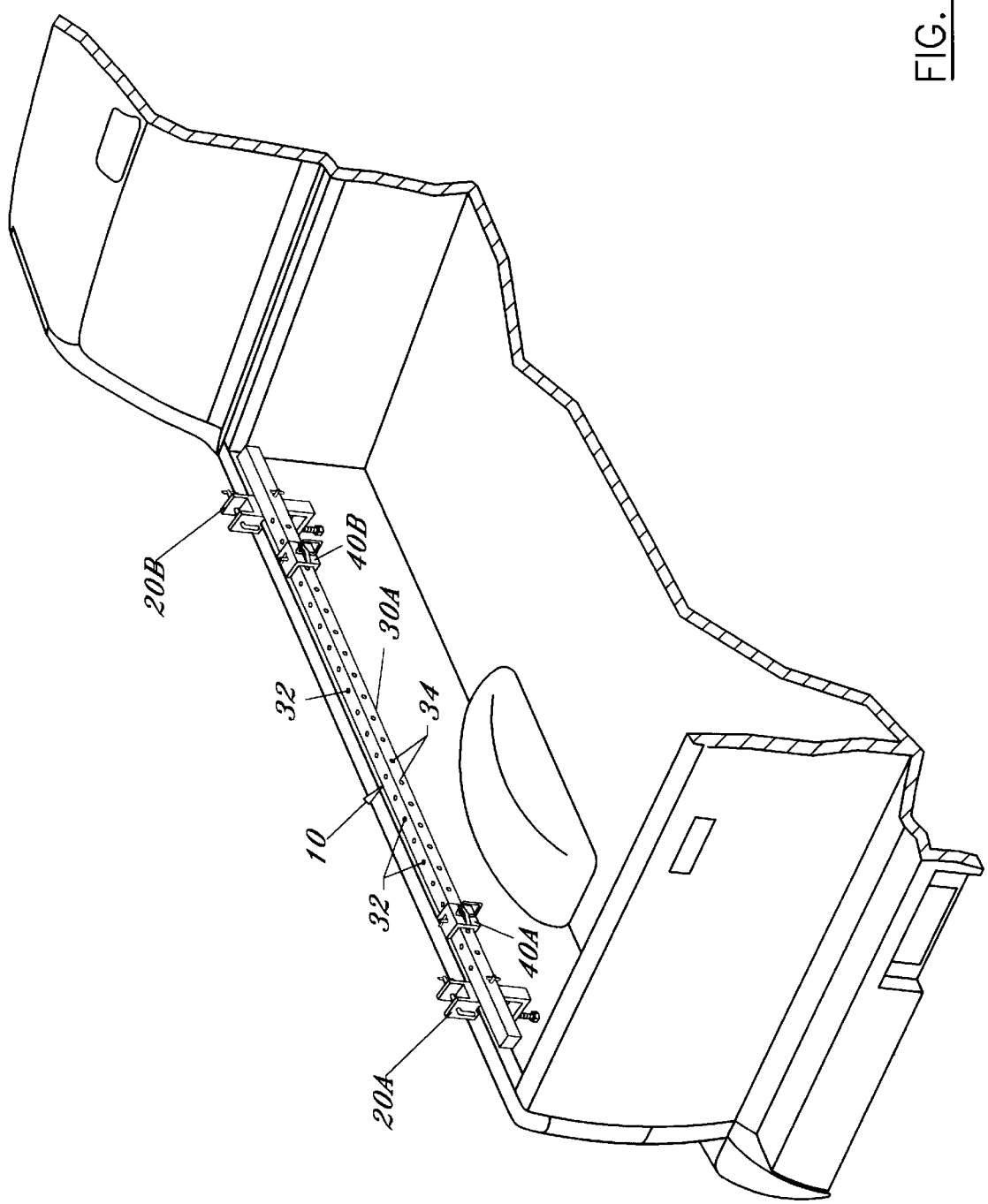
FIG. 2 shows a perspective view of the present invention installed in the stowed configuration on a pickup truck.
Figure 3:
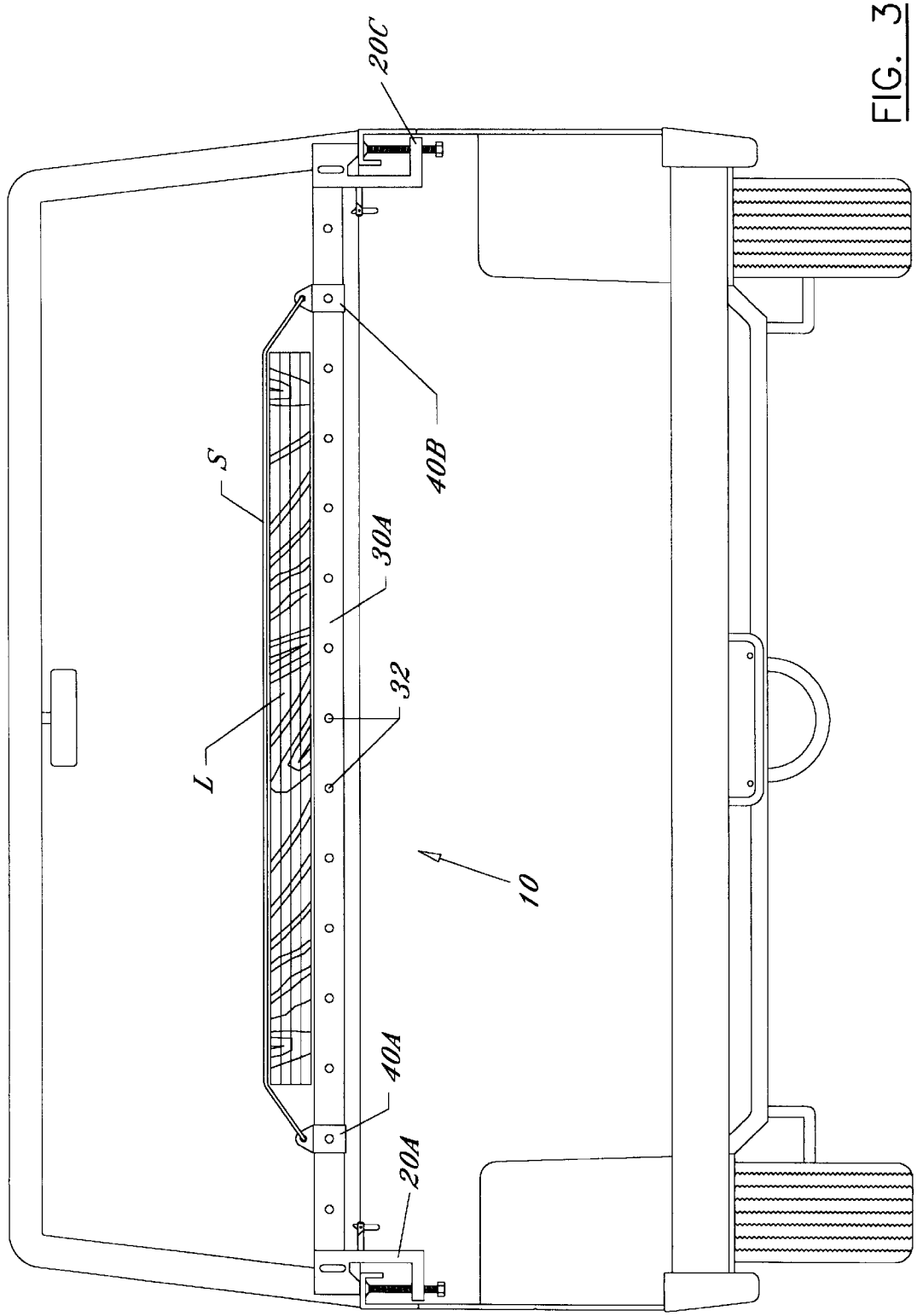
FIG. 3 shows a rear elevational view of the present invention installed in the deployed configuration on a pickup truck.
Figure 4:
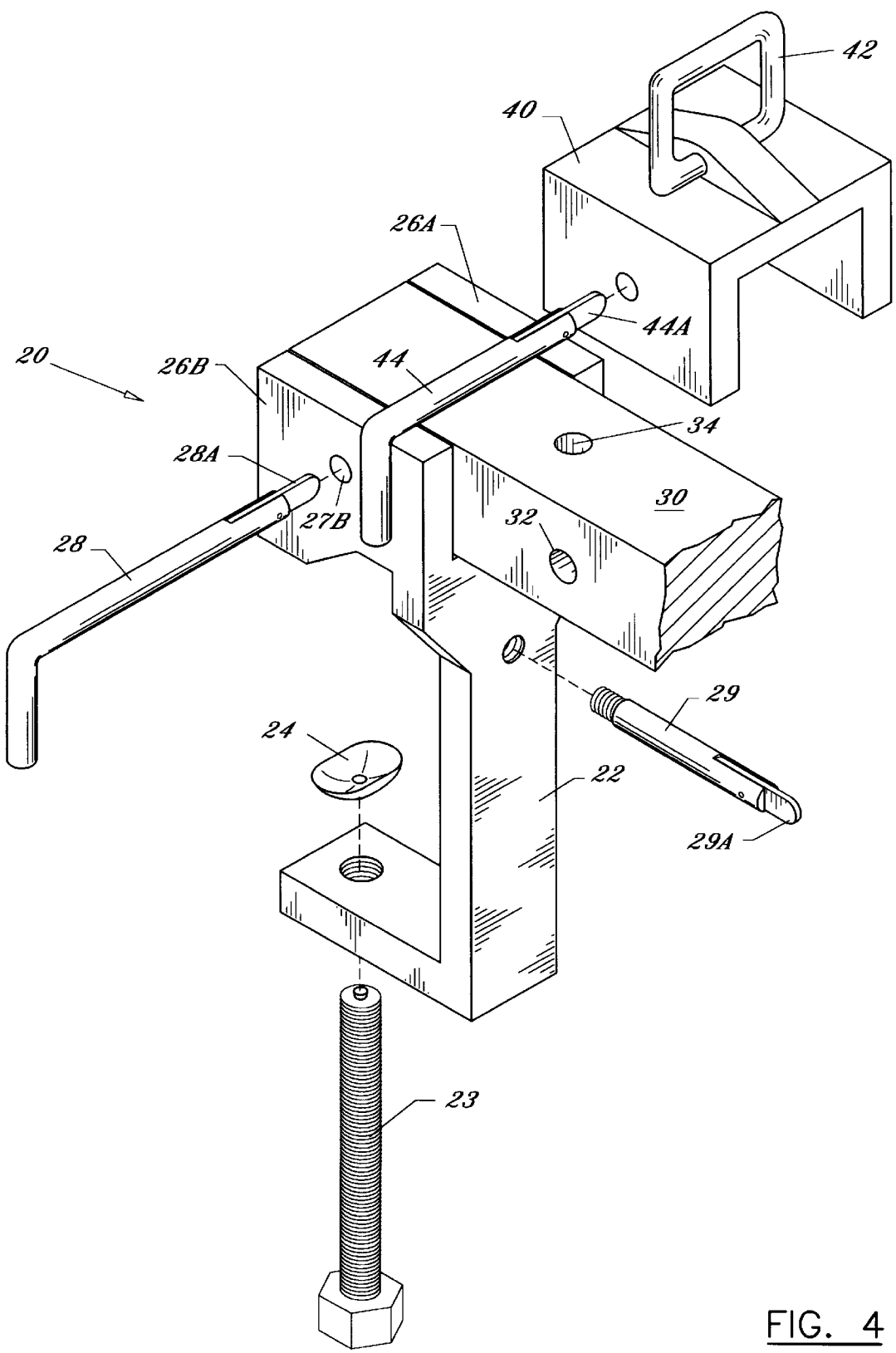
FIG. 4 shows an exploded perspective view of a bracket having an end portion of a load supporting beam received thereon.
Figure 5:
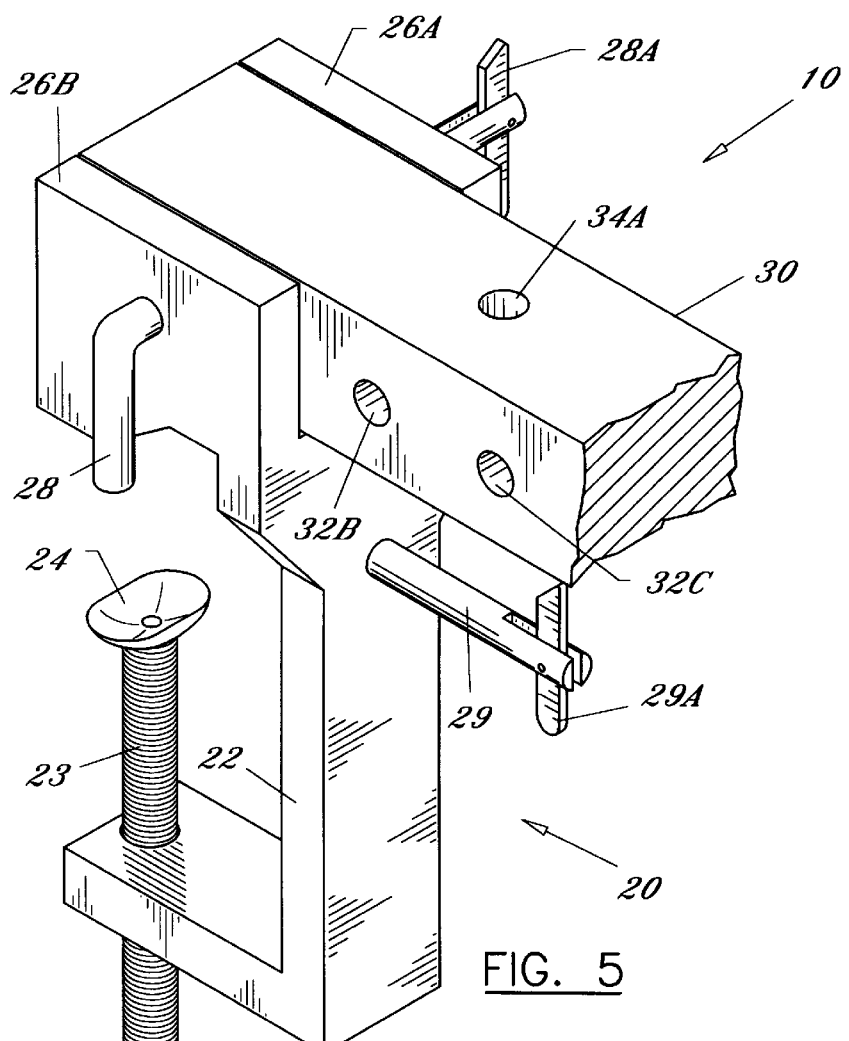
FIG. 5 shows a perspective view of a the bracket shown in FIG. 4.

A preferred embodiment of the deployable cargo rack of the present invention, generally referenced as 10, is illustrated in FIGS. 1–3. The present invention provides a deployable cargo supporting apparatus for pickup trucks having components that are deployable from a stowed configuration shown in FIG. 2, to a deployed configuration shown in FIG. 3. The primary components include a plurality of brackets, generally referenced as 20A–D, and a pair of load support beams, referenced as 30A and 30B. Brackets 20 are adapted for removable attachment to the inturned flanges formed by the side walls of the pickup truck cargo box, and include a structure designed for receiving and supporting beams 30. In the stowed configuration, shown in FIGS. 1B and 2, each load support beam 30 is secured parallel to one of the cargo box side walls proximate the top portion thereof by a pair of said brackets 20. Accordingly, the invention may be compactly carried within the pickup truck cargo box when not in use while leaving the cargo box free to accept a full load of cargo. In the deployed configuration, shown in FIGS. 1A and 3, the load support beams 30 are transversely disposed across the width of the cargo box, in an elevated position above the cargo box floor, and secured on opposing ends thereof by corresponding opposing brackets. As best seen in FIG. 3, in the deployed configuration, each support beam is positioned transversely across the width of the pickup truck cargo box, and the opposing end portions of each of said beams are anchored and received within the U-shaped top portion of corresponding bracket members. Once deployed, the load support beams are disposed across the width of the cargo bed and elevated above the cargo bed floor thereby providing elevated, load-carrying cross members capable of supporting substantial loads above the floor of the cargo bed. The deployed configuration thus provides the truck with a multi-level cargo carrying capacity whereby cargo may be carried directly on the support beams and additional cargo may be carried on the floor of the cargo box.

FIGS. 4, 5, and 7A and 7B, each show a detailed view of a preferred embodiment of the brackets, generally referenced as 20, of the present invention. Each bracket 20 defines a generally C-shaped clamp portion 22 for receiving the inturned flange formed by the pickup truck side wall. The C-shaped portion of bracket 20 further defines a threaded aperture for receiving a threaded member 23 terminating in a pressure plate 24 for anchoring the bracket to the cargo box side wall flange. Brackets 20 may include resilient, non-scratching, material such as rubber on portions thereof likely to come into contact with surfaces of a pickup truck and/or camper top to prevent scratching. In addition, each bracket further defines a generally U-shaped top portion, generally referenced as 26, for receiving an end of one of the load support beams in the deployed configuration. The U-shaped top portion includes a pair of upwardly extending legs 26A and 26B, each of which define an aperture, 27A and 27B respectively. A securing pin 28 is used to secure an end of one of the load support members within the U-shaped top portion 26 of a bracket 20. Securing pin 28 has an end portion incorporating a pivoting drop tab 28A. Securing pin 28 functions to secure an end of one of the load support members within the U-shaped top portion 26 of a bracket by insertion through aligned apertures 27A and 27B formed in legs 26A and 26B of the U-shaped portion, and a corresponding aperture formed in an end of support beam 30, for anchoring the end of the support beam to the bracket in the deployed configuration. Upon insertion of securing pin 28 through the apertures defined in the U-shaped portion 26 of bracket 20, drop tab 28A pivots under the influence of gravity such that the drop tab is vertically disposed and provides a stop to prevent securing pin 28 from being dislodged. Each bracket 20 further includes a storage pin 29 attached thereto and projecting therefrom for use in the stowed configuration. In the stowed configuration, storage pin 29 is received within an aperture defined by the load support beam and a drop tab, referenced as 29A, functions to prevent the support beam from sliding off of storage pin 29.

Figure 6:
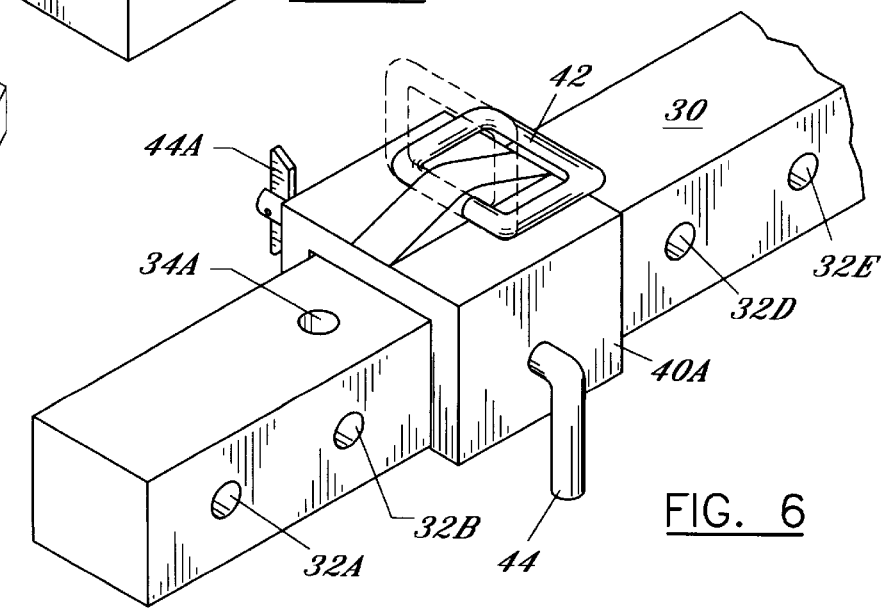
FIG. 6 shows a partial perspective view of a load supporting beam having a cargo tie-down device thereon.
Figures 7A, 7B:
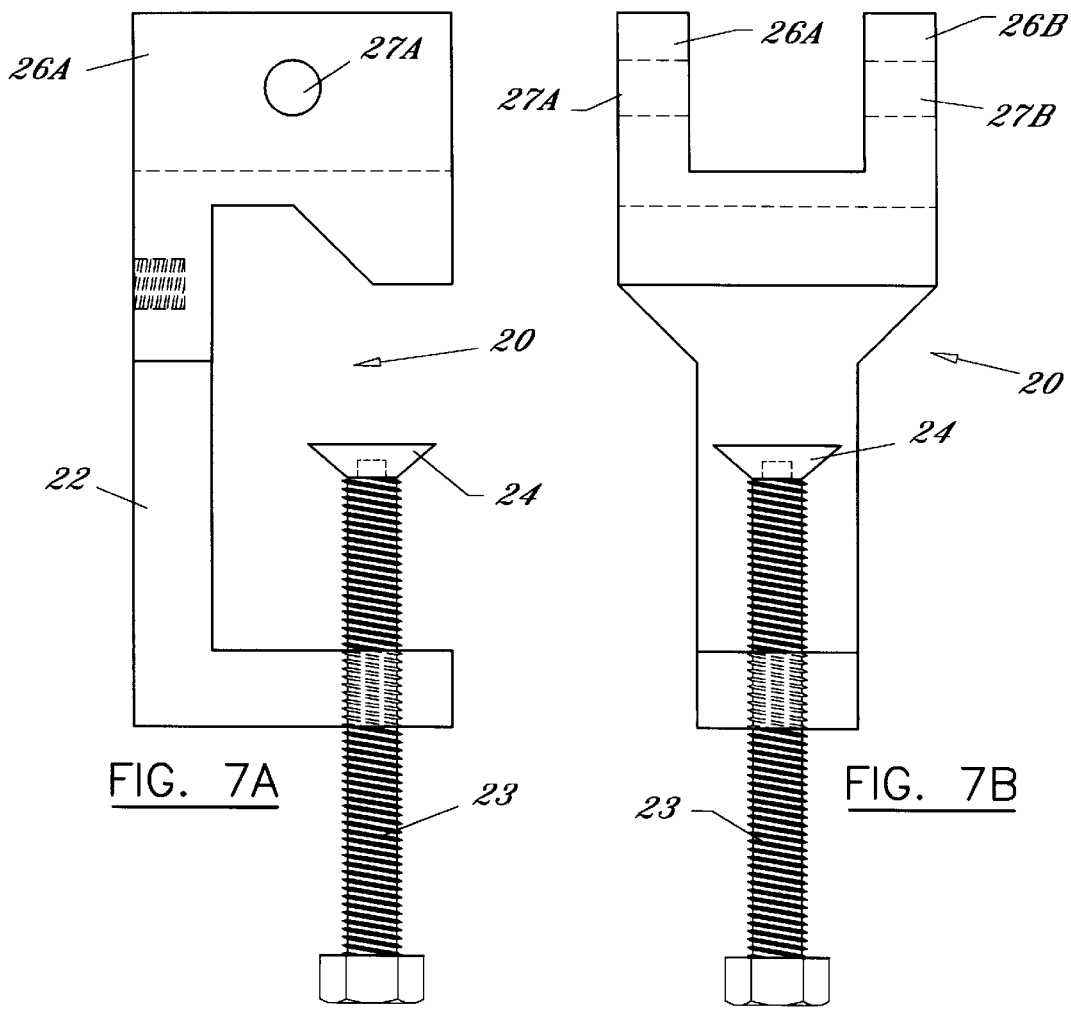
FIG. 7A shows a side elevational view of a bracket according to the present invention.
FIG. 7B shows a front elevational view of the bracket shown in FIG. 7A.
Figures 8A, 8B, 9:
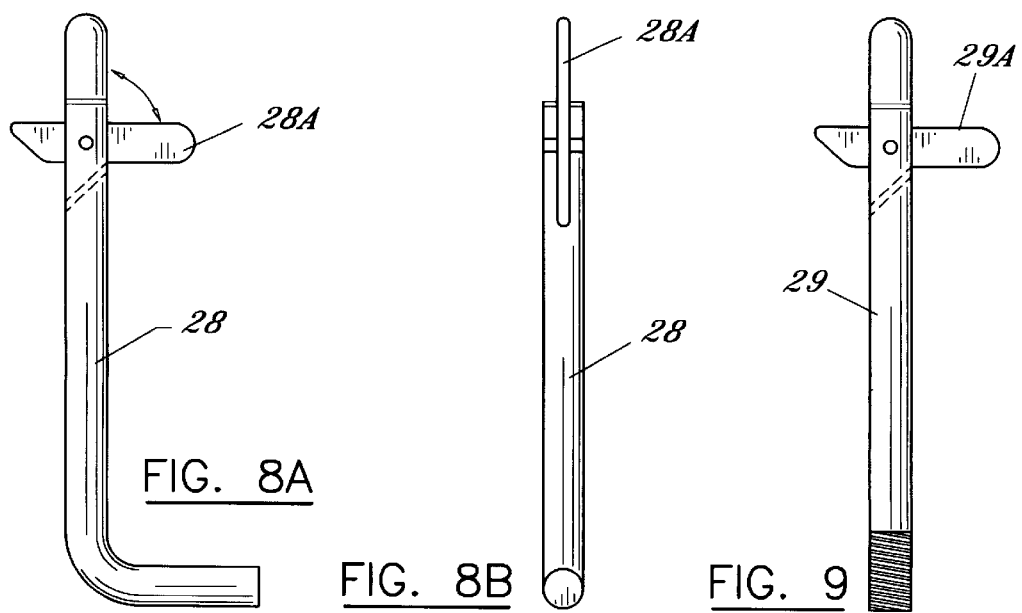
FIG. 8A shows a side elevational view of a securing pin.
FIG. 8B shows a front elevational view of the securing pin shown in FIG. 8A.
FIG. 9 shows a side elevational view of a beam storage pin.

As best depicted in FIG. 6, each load support beam 30 preferably comprises an elongate rigid beam defining a generally square or rectangular cross-section. In alternate embodiments beam 30 may comprise various cross-sectional configurations such a circular etc. The load support beams define a plurality of through holes 32 A–D, and 34A and 34B, in spaced relation along the length thereof for reasons that will be more fully described herein below. Each load support beam preferably includes a pair of cargo tie-down devices, referenced as 40A and 40B, slidably disposed thereon for providing longitudinally adjustable anchoring structures that may be selectively fixed at any one of a plurality of specific locations along the length of each beam. More specifically, each cargo tie-down device 40 may be fixed at user selected positions along a beam 30 by sliding a tie-down device to a desired position wherein apertures defined in the tie-down device align with a corresponding aperture 32 defined in the beam such that a securing pin 44 may be inserted therethrough. As best depicted in FIGS. 6 and 11B, tie-down devices 40 are shaped in the form of an inverted "U" having an open bottom portion to for allowing each tie-down device to be easily removed without requiring removal of corresponding beam 30 from brackets 20. Securing pins 44, are similar in structure to pins 28, and preferably include a pivoting drop tab 44A connected at one end of the pin, which drop tab pivots under the influence of gravity to prevent the pin from dislodging from its inserted position in any given configuration. Each cargo tie-down device 40 includes a ring-like structure 42 though which straps, rope, or the like may be secured and/or tie off for securing cargo.

In a first embodiment of tie-down device 40, seen in FIG. 6, the ring-like structure 42 is pivotally connected thereto. In the deployed configuration, beam aperture 32A is aligned with bracket apertures 27A and 27B and the beam is anchored by insertion of pin 28 therethrough. In the stowed configuration, beam apertures 34A and 34B each receive a storage pin 29 therethrough from one of said brackets thereby securing the beam, and tie-down devices 40, along the cargo box side wall.

An alternate embodiment tie-down device, referenced as 50, is shown in FIGS. 11A and 11B. Alternate tie-down device 50 is fabricated from a single piece of material, such as metal or rugged plastic, and includes an integrally formed ring-like structure 52 providing a tie-down point for cargo restraining straps and the like.

The present invention provides a deployable cargo rack structure that is suitable for use with pickup trucks with camper top cargo box enclosures as best depicted in FIG. 10. Since camper tops are very common pickup truck accessories found on a large number of trucks many cargo racks found in the background art are not suitable for use such trucks. The present invention, however, overcomes the disadvantages present in many of the cargo racks of the background art. Specifically, brackets 20 may be attached such that the inwardly turned flanges of both the cargo box side wall and the camper top are sandwiched within the C-shaped portion 22 of each bracket.

INSTALLATION AND USE

The present invention is installed on pickup trucks, with or without camper tops, by first attaching a pair of brackets 20 in spaced relation along each cargo box side wall. The spacing between each pair of brackets is such that spacing between corresponding pins 29 equals the spacing between beam apertures 34A and 34B such that beam 30 may be secured by pins 29 inserted in each of apertures 34A and 34B as seen in FIGS. 1B and 2. As is apparent, the invention is unobtrusively stowed along the cargo box side rails leaving the cargo box unobstructed and available for conventional use.

The present invention is deployed by manually pivoting storage pin tabs 29A such that the tabs are parallel to the longitudinal axis of securing pin 29, whereby each beam 30 may be slidably disengaged from pins 29. As best seen in FIGS. 1A, 3, 4, and 5, each beam 30 is then positioned transversely across the width of the pickup truck cargo box and the ends thereof are received within the U-shaped portions 26 of opposing brackets 20 and secured to the brackets by the insertion of pins 28 through bracket apertures 27A and 27B and beam aperture 32A. Once deployed beams 30 provide a cargo supporting structure that is elevated above the floor of the cargo box upon which cargo, shown as a fictitious load, may be supported. The cargo supported by beams 30 is secured by sliding tie-down devices 40A and 40B into a user selected position on opposite sides of the cargo and anchoring the devices by insertion of pins 44. As is apparent, tie-down devices may be fixed at any suitable location along beams 30 by alignment of the tie-down devices with any of apertures 32B, 32C, 32D, etc. Tie-down devices thus provide a fixed anchoring point for securing the cargo by rope, straps or the like.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A deployable cargo rack for use with a pickup truck, said pickup truck having a cargo box defined by a floor and opposing side walls extending upwardly from said floor, said side walls each terminating in an inwardly turned flange, said cargo rack consisting of:
- a pair of elongate load supporting beams, each of said beams defining a plurality of apertures;
- each of said beams including a pair of tie-down devices, each of said tie-down devices slidably positionable alone said beams;
- means for selectively anchoring each of said tie-down devices at positions along the length of said beams;
- four brackets for securing said load supporting beams, each of said brackets including a clamp portion for removably connecting a bracket to one of the flanges defined by the pickup truck side walls, each of said brackets further including a U-shaped top portion configured for removably receiving a portion of one of said beams therein when said beam is transversely disposed across the width of the pick up truck cargo box;
- said brackets each further including a horizontally projecting storage pin;
- said beams selectively positionable from a stowed configuration wherein each of said beams is fixed by two of said brackets along a common cargo box side wall by said projecting storage pins, to a deployed configuration wherein each of said beams is disposed transversely across the cargo box and supported on opposing ends thereof by said U-shaped portions of opposing brackets.

2. A deployable cargo rack for use with a pickup truck according to claim 1, wherein each of said beam storage pins include a gravity actuated pivoting tab at the distal end thereof for securing a portion of one of said beams in said stowed configuration.

3. A deployable cargo rack for use with a pickup truck according to claim 1, wherein each bracket includes a retaining pin for securing an end of a beam within the U-shaped top portion of each of said brackets in the deployed configuration.

4. A deployable cargo rack for use with a pickup truck according to claim 3, wherein each retaining pin includes an end portion having a pivoting tab.

5. A deployable cargo rack for use with a pickup truck, said pickup truck having a cargo box defined by a floor and opposing side walls extending upwardly from said floor, said side walls each terminating in an inwardly turned flange, said cargo rack suitable for use with pickup trucks equipped with a camper top accessory, said cargo rack consisting of:
- four brackets adapted for attachment to a pickup truck cargo box side wall, each of said brackets including a C-shaped clamp portion and a U-shaped top portion, said C-shaped clamp portion for selectively connecting the bracket to one of the pickup truck side walls, said U-shaped top portion configured for orientation toward the opposing pickup truck side wall when the bracket is connected to one of the pickup truck side walls;
- two elongate load supporting beams, each of said beams defining a plurality of apertures extending therethrough;
- a pair of tie-down devices matingly engaging each of said load supporting beams and slidably positionable along the lengths thereof;
- means for independently anchoring said pair of tie-down devices relative to said beams;
- said beams selectively configurable from a stowed configuration wherein said beams are each fixed by two of said brackets along opposing cargo box side walls, to a deployed configuration wherein each of said beams is disposed transversely across the cargo box and supported on opposing ends thereof by opposing brackets.

6. A deployable cargo rack for use with a pickup truck according to claim 5, wherein said means for individually anchoring said pair of tie-down devices relative to said beams includes a securing pin.

7. A deployable cargo rack for use with a pickup truck according to claim 6, wherein said securing pin includes a drop tab pivotally connected to a distal end thereof.

8. A deployable cargo rack for use with a pickup truck according to claim 5, further including means for individually securing the ends of said load bearing beams within said U-shaped portion of said brackets.

9. A deployable cargo rack for use with a pickup truck according to claim 8, wherein said means for individually securing the ends of said load bearing beams includes securing pins.

* * * * *